United States Patent [19]
Hengesbach

[11] 3,756,273
[45] Sept. 4, 1973

[54] VALVE

[76] Inventor: Robert W. Hengesbach, 7886 Munson Rd., Mentor, Ohio 44060

[22] Filed: Nov. 22, 1971

[21] Appl. No.: 200,896

[52] U.S. Cl.................. 137/540, 137/541, 137/542, 137/543.13
[51] Int. Cl............................................. F16k 15/02
[58] Field of Search.................... 137/541, 540, 542, 137/543, 543.13, 543.23, 516.27

[56] References Cited
UNITED STATES PATENTS

| | | | |
|---|---|---|---|
| 1,776,060 | 9/1930 | Beckwith | 137/516.27 |
| 1,860,004 | 5/1932 | Yardley | 137/543.13 |
| 2,408,541 | 10/1946 | Wilson | 251/332 X |
| 2,744,727 | 5/1956 | Osburn | 137/543 X |
| 2,965,309 | 12/1960 | Parrott | 239/426 X |
| 3,152,607 | 10/1964 | Lundeen | 137/542 X |
| 3,209,777 | 10/1965 | Salisbury | 137/543.13 X |
| 3,473,561 | 10/1969 | Svenson et al. | 137/541 X |
| 3,556,136 | 1/1971 | White | 251/368 X |
| 3,587,632 | 6/1971 | Clay | 137/543 |

FOREIGN PATENTS OR APPLICATIONS

| | | | |
|---|---|---|---|
| 1,179,894 | 12/1958 | France | 137/541 |
| 1,228,191 | 3/1960 | France | 137/543.15 |
| 1,500,026 | 5/1969 | Germany | 137/542 |

Primary Examiner—William R. Cline
Attorney—John Harrow Leonard

[57] ABSTRACT

The valve plug has an axially tapering peripheral wall with a groove therein. An O-ring is disposed in the groove and extends radially outwardly beyond the peripheral wall. The body has an annular seating wall which tapers in the same direction as the plug. In the closed position, the O-ring is compressed between the seating wall and plug sufficiently to provide a tight seal while constraining the wall of the plug and the seating wall from seating engagement so that precise finish of the walls is unnecessary. The plug is supported for axial movement toward and away from the seating wall and for floating slightly radially so that precise fitting and alignment of the plug and seating wall are unnecessary for effective closure.

The valve is adjustable to change the rate of flow and delivered pressure by exterior manipulation of the body, or by adjustment means within the body.

A resilient coating of TEFLON or silicone is provided on the walls. The plug may be radially expansible by the pressure of fluid at its larger end.

13 Claims, 11 Drawing Figures

INVENTOR.
ROBERT W. HENGESBACH
BY
John H. Leonard
his ATTORNEY.

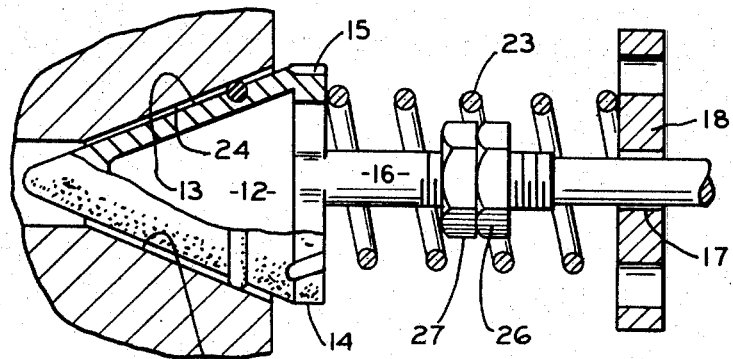
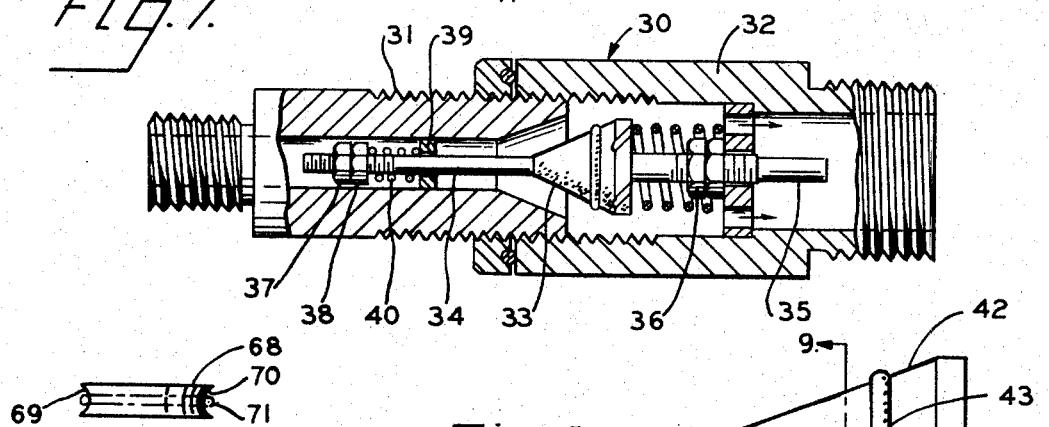
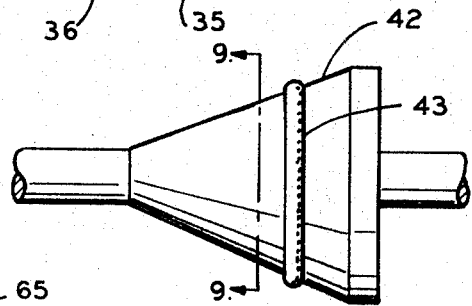
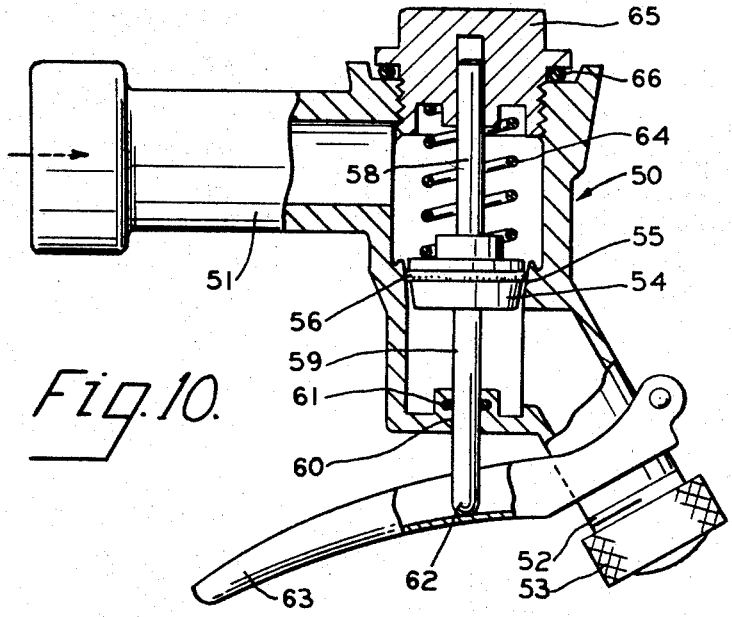
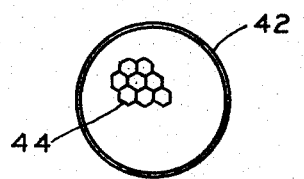
INVENTOR.
ROBERT W. HENGESBACH
BY
John H. Leonard
his ATTORNEY.

VALVE

BACKGROUND OF INVENTION

1. Field of Invention

Valve with an axially movable plug adapted for use as a check valve, flow control valve, and pressure regulating valve.

2. Description of Prior Art

Prior valves, such as check valves and the like, have been provided in which the plug and seat are frusto-conical. The seating surfaces thereof are ground and lapped to a precise fit and directly engage to effect a seal. These valves must be precisely machined and assembled in order that the plug can be guided so as to move in direct coaxial alignment with the seat. The plug is constrained at all times to coaxial relation with the seat so as to prevent any shifting of the valve plug out of coaxial relation with the seat and any tilting or rocking of the plug transversely of its axis relative to the axis of the seat. This is to assure precise seating not only for sealing, but also to prevent damage and unequally distributed wear of the metal seating surfaces.

These prior valves are not adjustable as to delivered pressure and flow. They are open to the objection that the manufacturing cost is extremely high, and that any accumulation of foreign matter on the seating areas and wear on the guiding parts result in malfunctioning and leakage. In some instances, a conventional seal is provided on the plug to supplement or augment the sealing effect of the complementary metal seating surfaces of the plug and seating wall. In these cases, also, the valve is precisely guided, and sealing depends primarily upon the engagement of the complementary metal seating surfaces.

A later development is one in which an O-ring is carried by the plug and is movable axially relative thereto. The plug and seating wall in the body are metal and are arranged to interengage in seating relation to arrest the forward movement of the plug. Before this seating occurs, however, the O-ring is moved along the plug to a sealing position with respect to the seating wall. The direct contact of the plug and seating wall prevents squeezing of the O-ring past the plug. Aalve of the latter type is disclosed In U.S. Pat. No. 2,912,000, issued Nov. 10, 1959.

The present valve eliminates the necessity for precise guiding of the plug and seating of complementary metal seating surfaces. The valve is generally self-cleaning. It is capable of providing an effective seal even when the seating area of the seat has become fouled with foreign matter. The valve lends itself to economic quantity production in any and all sizes desired. It is adjustable as to rate of flow and delivered pressure.

Various other objects and advantages will become apparent from the following description in which reference is made to the drawing.

SUMMARY OF INVENTION

A valve which provides a tight seal without direct contact between the metal plug and seat, is self-cleaning, and is settable for flow and pressure control, each by manipulation of exterior portions of the valve body.

DESCRIPTION OF DRAWING

FIG. 4 is an enlarged longitudinal sectional view of the valve in the closed position illustrated in FIG 2;

FIG. 7 is a view, similar to FIG. 1, illustrating a modified form of the valve;

FIG. 8 is a fragmentary side elevation of a modified form of the plug used in the valve;

FIG. 9 is a cross sectional view of the modified form of the plug, and is taken on the line 9—9 in FIG. 8;

FIG. 10 is a side elevation, partly in section, illustrating the embodiment of the plug in a water control nozzle; and FIG. 11 is the side elevation of the modified form of O-ring that may be used in the present invention.

Figure 1:
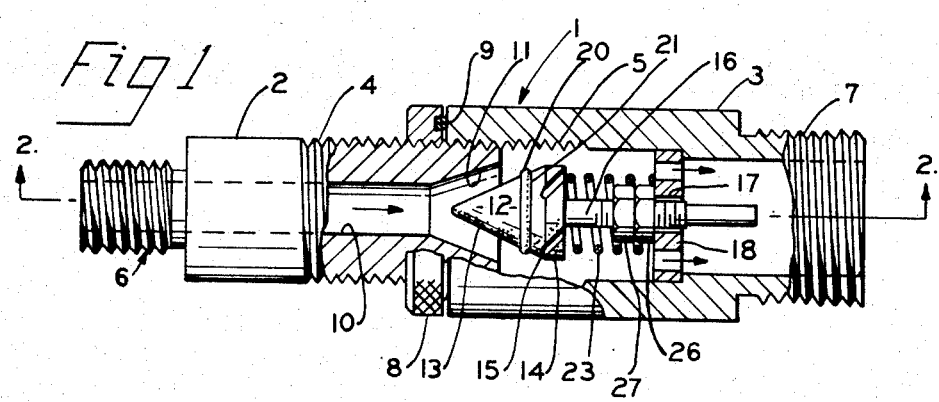
FIG. 1 is a side elevation of a valve embodying the principles of the present invention, the valve being in open position and part thereof being shown in section for clearness in illustration.
Figure 2:
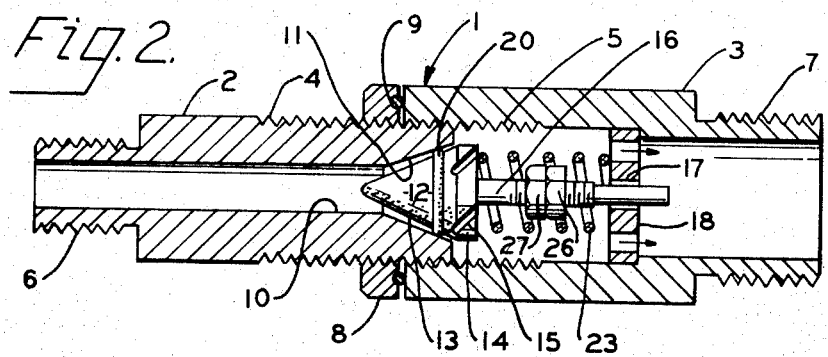
FIG. 2 is a view similar to FIG. 1, but showing the valve in closed position.

Referring to the drawings, the valve comprises a body 1 composed of an inlet part 2 and a discharge part 3. The parts 2 and 3 are connected together in coaxial telescopic relation for adjustment to different relative positions axially by means of external threads 4 on the body part 2, and internal threads 5 in the body part 3. The inlet end 6 of the part 2 is externally threaded for connection to a source of fluid under pressure, and the outlet 7 of the part 3 is externally threaded for connection to a discharge line. The body parts 2 and 3 can be secured firmly in selected axially adjusted positions by means of a lock or jam nut 8, an O-ring 9 being secured between the body parts for providing a seal in all adjusted positions of the body parts 2 and 3.

The purpose of making the valve body parts axially adjustable is for controlling the rate of flow and pressure of the fluid discharged from the valve, as will later be described.

The body part 2 has an inlet bore 10 coaxial with its threaded portion 4 and leading to a frusto-conical seating wall 11 arranged with its small base disposed at the discharge end of the inlet bore 10 and with its large base facing toward the body part 3, so that the seating wall 11 is flared outwardly from its inlet end toward its outlet end.

Mounted within the body part 3 in coaxial, or approximately coaxial, relation with the seating wall 11 is a frusto-conical valve plug 12 which has a peripheral wall 13 which tapers in the same direction as the seating wall 11 of the part 2, but not necessarily at the same angle. At its larger end, the plug has a rim 14 in which notches or grooves 15 are provided oblique to the axis of the plug so that water and liquid flowing through the valve passes in part through the notches 15 causing the plug to rotate very slowly about its axis as it unseats. The plug 12 is provided with a stem 16 which is coaxial, or substantially coaxial therewith and which extends from theplug toward the outlet of the part 3. The stem 16 is loosely received in a passage 17 of a spider 18 which is mounted within the part 3. The passage 17 is approximately coaxial with the inlet passage 10 and the seating wall 11 and accommodates the stem 16 with substantial radial clearance so that the stem can shift or float freely to a limited extent radially as well as axially, can rock an appreciable amount transversely of its axis, and can rotate freely about its axis. The clearance also renders the stem and wall of the passage 17 self-cleaning. This arrangement is such that the stem and spider cooperate to direct the plug generally toward the seating wall 11 in approximate alignment therewith while allowing the plug itself to float slightly radially and rock slightly for adjusting itself in the proper position relative to the seating wall 11 to assure proper closing and sealing of the valve. Sealing is effected by means of an O-ring 20 carried in an external annular groove 21 in the plug near the rim 14. The O-ring 20 is seated in the groove so that it is held substantially in fixed position axially of the plug. The ring is of such diameter and cross section that it protrudes outwardly beyond the tapered peripheral surface of the plug sufficiently so that when the plug 12 is moved a sufficient distance toward the seating wall 11, the O-ring engages the wall 11, centers the plug, and effects a tight seal therewith while the peripheral wall 13 of the plug is slightly radially spaced from the wall 11. Thus the walls 11 and 13 do not interfere with the seating of the O-ring despite roughness or inaccuracies in their surfaces, and inaccuracies in alignment of the seating wall 11, the stem 16, the plug 12, and the wall of the passage 17 do not prevent proper sealing.

Instead, the plug finds its own proper position for effecting the seal, shifting radially and rocking, if necessary, to this end.

A light spring 23 is disposed between the spider 18 and the large end of the plug 12 so as to bias the plug to the sealing position.

Preferaly, the surface of the sealing wall 11 and the peripheral surface 13 of the plug 12 are coated with TEFLON or other types of plastic coating which has a lubricating effect and is resistant to corrosion and adherence of any foreign matter thereto. Such a coating also reduces friction and facilitates the flow through the valve. The coating assists in assuring better seating of the plug and sealing by the O-ring. Also, particularly when combined with the rotation of the plug due to the notches 15, it renders the seating wall and plug surface 13 self-cleaning.

In FIG. 4, when the plug is in seating position, the clearance between the peripheral surface 13 of the plug and the seating wall 11 is indicated at 24. This clearance may be uniformly distributed about the plug 12 or the surface 13 of the plug may engage the wall 11 slightly at one side of the plug, with the result that most of the clearance is at the opposite side of the plug. When uniformly distributed, this clearance is about 1/64 of an inch, depending upon the size of the plug.

It is desirable that, in the operation of the valve, the plug 12 is never moved axially to a position in which it is totally withdrawn from the space defined by the seating wall 11. This is because, during movement toward closed position, regardless of any rocking of the valve, the tapered portion between the small end and the O-ring will strike the wall 11 and guide the plug into a proper position for effective sealing by the O-ring.

In order to assure that the plug is not fully removed from this space defined by the wall 11, an abutment 26 is provided on the stem 16 and is in a position to engage the spider 18 to limit the movement of the plug in a direction axially away from the seating wall 11 in the opening direction of the plug so that a substantial portion of the plug between the O-ring and its smaller end is always within the axial limits of the wall 11. The abutment 26 may be in the form of a nut threadably connected to the stem so as to be adjustable axially thereof. The abutment 26 is securely held in adjusted position by a jam nut 27.

Figure 3:
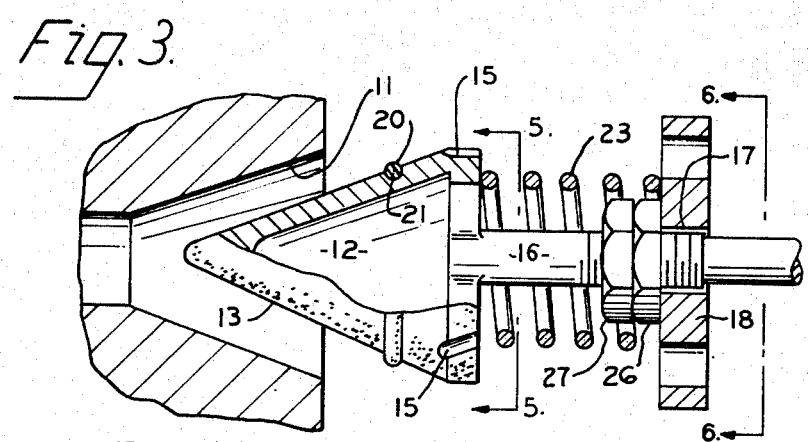
FIG. 3 is an enlarged fragmentary longitudinal sectional view of the valve in the open position illustrated in FIG. 1.
Figures 5, 6:
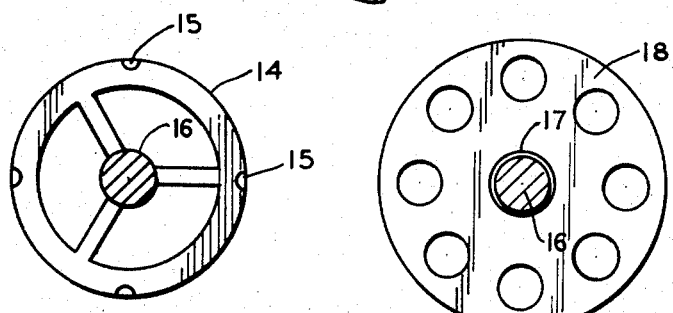
FIG. 5 is a fragmentary sectional view of the valve and is taken on the line 5—5 in FIG 3.
FIG. 6 is a fragmentary sectional view of the valve and is taken on the line 6—6 of FIG. 3.

The abutment 26 can be adjusted not only to limit the maximum displacement of the plug 12 axially toward the discharge end of the valve, but also limit the degree of unseating of the valve and thus adjust the flow from substantially zero to maximum rated flow. For example, if very restricted maximum flow is desired, the abutment 26 may be screwed away from the plug 20 so as to provide maximum opening of the plug 12 to a position in which the O-ring is barely unseated. By screwing the abutment 26 in the opposite direction, the plug may be moved to a fully open maximum flow position, as illustrated in FIG. 3, or to selected intermediate positions. Thus a selected rate of flow can be pre-set before the valve is assembled. Both rate of flow and the control of pressure can be adjusted from the exterior of the valve body by manipulation of the parts 2 and 3 of the body to different relatively telescoped positions axially, and locking them in a selected position by the jam nut 8. For example, by grasping the parts 2 and 3 of the body and rotating them relative to each other in one direction they can be driven to a relatively more telescoped position in which case, while the position of the abutment 26 remains in fixed position on the stem 16, maximum opening of the valve can be limited so as to permit a very restricted flow. Furthermore, by this adjustment, the spring 23 can be compressed to different degrees, thus changing the resistance to unseating of the plug, or to further opening of the plug when already unseated. This controls the pressure at which the valve opens and also its delivery pressure.

Various combinations of these axial adjustments of the body parts 2 and 3 and of the abutment 26 are possible, and provide a wide range of effective opening pressures and discharge delivery pressures.

As a result of this arrangement for sealing by virtue of the O-ring, without requiring a seating contact between the peripheral surface 13 of the plug and seating wall 11, the seating wall 11 and the surface 13 may be formed by simple molding operations, whether in metal or plastic, because the surface of the walls 11 and the surface 13 need not be as smooth, or polished or lapped and as accurately machined and aligned as would be necessary if the seal were to be between the walls 11 and surface 13. The effective sealing by the O-ring is due in part to the free floating of the plug a limited amount radially and, in part, to the relatively free rocking of the plug provided by the substantial clearance between the stem 16 and the walls of the passage 17. Consequently, the stem 16 and the spider passage 17 do not have to be precisely machined with respect to each other, as the play allowing slight radial migration of the stem and rocking thereof is desirable rather than being a handicap.

The valve and the parts thereof may be made of plastic or metal or various casting compositions. Further, with the present arrangement, the greater the back pressure the tighter the sealing effect. Due to the tapered arrangement of the surface 13 and wall 11, there is no danger of the O-ring squeezing out between the plug 12 and the wall 11. As the back pressure increases, the clearance is progressively decreased and the O-ring progressively compressed radially.

Further, the structure lends itself to a range from very small valves to very large valves in which serious problems were heretofore presented due to extreme weight of the valve plug and the necessity for precisely machined cooperating seating surfaces and heavy and precisely surfaced guiding means.

Referring next to FIG. 7, a valve similar to that heretofore described is illustrated and comprises a body 30 having relatively telescopic threaded parts 31 and 32. A valve plug 33 is supported in the body by a dual stem, one stem 34 being provided at the inlet side of the plug and another stem 35 being provided at the outlet side of the plug. The stem 35 is provided with an abutment nut 36, corresponding to the abutment 26 heretofore described. The stem 34 also is provided with an abutment nut 37, and a jam nut 38, so that selected maximum opening positions of the valve can be controlled by an adjustment of the nut 37 axially of the stem 34. A supporting spider 39 in which the stem 34 is loosely guided is mounted in the body.

If desired, a seating spring 40 may be interposed between the nut 37 and the spider.

By adjusting the nut 37, a total effective spring force biasing the valve plug toward seated position, can be adjusted, whereby pressure control is provided.

The plug 33 may be solid or, if desired, it may be hollow, as illustrated in FIG. 3, so that the peripheral wall of the plug, especially in the locale of the O-ring 20, can yield resiliently slightly outwardly under extremely high pressures applied at its large end, to assist in sealing. Such a hollow plug has a high resistance to radial collapse.

Another advantage of the hollow plug is the reduction in weight so that the plug is less subject to inertial forces and can seat and unseat readily. A further advantage is that in the case of large plugs operating with their axes horizontal, the weight of the plug, even when guided at both ends, can adversely affect operation, especially with metal plugs a foot or more in diameter. Consequently, it is desirable that the plug be as light as possible to facilitate manufacturing, handling and repairs and to reduce frictional forces during operations. However, in some instances, lightness is desired combined with exceedingly high strength. For this purpose, the structure illustrated on FIGS. 8 and 9 is used. As there illustrated, a plug 42, similar to the plug 33, having an O-ring 43, is used. The plug 42 is made light while retaining the strength by making the internal structure of cellular or honeycomb formation, as indicated at 44. This imparts lightness while concurrently offering great resistance to inward radial collapse of the plug. At the same time it does not necessarily completely prevent slight expansion of the plug radially.

Referring next to FIG. 10, the principles of the present invention are shown embodied in a control valve such as is used on garden hoses and the like, and as described in my copending application for U.S. letters Pat., Ser. No. 723,377, filed Apr. 23, 1968 and entitled "Spray Nozzle" now U.S. Pat. No. 3,632,046. As illustrated in FIG. 10, the control valve has a body 50 with an outlet 52 to which a spray nozzle 53 may be connected, if desired. The valve includes a tapered plug 54 cooperating with an annular seating wall surface 55 which tapers in the same direction as the plug. An O-ring 56 is provided in an annular groove on the plug for effecting a seal while the peripheral wall of the plug 54 is out of sealing relation to the surface 55. The plug is guided at one end loosely by a stem 58. At the other end a stem 59 is provided and extends through a suitable passage 60 in the body 50, an O-ring 61 being mounted in the body slidably engaging the stem 59 while preventing escape of fluid or water between the stem and the wall of the passage 60. The stem 59 not only serves the function of holding the plug in approximate alignment with its seat in various axial positions of the plug, but also extends outwardly of the body and has its outer end, indicated at 62, in engagement with a pivoted handle 63 which is operable for opening the valve when desired. The plug 54 is biased by a spring 64 to seating position, the plug and spring being insertable through an opening in the upper end of the body 50. After insertion of the plug and spring, the opening in the upper end is closed by a suitable screw plug 65 and sealed by a suitable O-ring 66. This reduces greatly the number of fittings heretofore necessary in structures of this type.

The O-rings heretofore described are shown as the conventional ones which have a circular cross section. However, as illustrated in FIG. 11, O-rings such as the O-ring 68 may be used. This O-ring is of the type having a large concave, outwardly opening groove 69 in its outer wall, the groove terminating short of the ends so that the end margins of the ring, at the axially opposite sides of the groove 69, as indicated at 70, provide the sealing surfaces. An annular tension spring 71 is disposed in the base of the groove and is normally under a tension so as to urge the ring to the contracted condition. This type of O-ring can maintain its position axially of the plug without any tendency to roll about its circumferential axis, while making an effective seal which increases as the pressure increases.

Having thus described my invention, I claim:

1. A valve comprising a hollow body having an inlet and an outlet;

an annular frusto-conical seating wall in the body between the inlet and outlet and tapering axially in one direction;

a plug having a peripheral annular frusto-conical wall tapering in said one direction and movable toward and away from said seating wall upon axial reciprocation of the plug toward seated and open positions, respectively; said frusto-conical walls each having an acute included angle;

aligning means for guiding the plug toward and away from seated position;

a spring biasing the plug toward seated position;

said plug having a circumferential groove therein;

a resilient O-ring seal disposed in said groove and constrained thereby within predetermined very close limits axially of said plug wall and protruding radially therefrom beyond the adjacent surface of said plug wall;

said O-ring being of much less length axially than said walls and being related in cross sectional size and shape to said walls so as (a) to form a tight seal for stopping flow through the body while said walls are in closely adjacent, radially spaced, relation to each other, and (b) to constrain the walls from seating contact throughout their extent at all times while the O-ring is effecting said tight seal;

each of said frusto-conical annular walls being of sufficient length axially so that a substantial length of said frusto-conical wall of the plug is disposed between the end limits of said frusto-conical seating wall in all axial positions of the plug, and defines with said seating wall an annular flow passage of substantial length axially in all of said open positions of the plug.

2. The structure according to claim 1 wherein aligning means are provided in the body and are connected to the plug so as to direct the plug in a path generally toward the seating wall while supporting the plug for free floating movement along said path and limited free rocking and migrating movement transversely of said path; and said aligning means comprise a stem on, and coaxial with, the plug;
   a guiding sleeve carried in the body and embracing the stem loosely enough so that the stem can rock appreciably transversely of its axis.

3. The structure according to claim 2 wherein said stem is on the end of the plug opposite from the frusto-conical wall of the plug and extends away from the seating wall in the direction of opening of the plug;
   said spring is carried on the stem;
   a second aligning means is provided and includes a stem on, and coaxial with, the plug at the opposite end of the plug and extending therefrom in the closing direction of the plug;
   a second guiding sleeve is carried in the body and embraces and guides the second stem; and
   a second spring is carried on the second stem and biases the plug toward seated position.

4. The structure according to claim 3 wherein means are provided for adjusting the forces applied by the springs to the plug independently of each other.

5. The structure according to claim 3 wherein the body has two separate parts connected together for movement to different adjusted positions axially of the stems;
   one of said stems extends into one body part and the other stem extends into the other body part;
   the restraining means includes abutments in the body parts, respectively, each abutment being in fixed axial position in its associated body part; and
   abutments on the stems, respectively, complementary to the abutments in the body parts, respectively.

6. The structure according to claim 5 wherein at least one of said complementary abutments is adjustable axially of its associated stem.

7. The structure according to claim 6 wherein at least the spring in one body part is disposed between the abutment on the stem in said body part and the complementary abutment in said body part, whereby the force of said last mentioned spring can be adjusted by moving the body parts axially relative to each other.

8. The structure according to claim 1 wherein a stop is carried by the body structure;
   a complementary stop is carried by the plug structure;
   said stops being operative when in engagement to arrest movement of the plug away from said seating wall at a predetermined maximum open position of the plug;
   said stop on the plug being adjustable axially to different positions relative to the plug for preselecting the maximum open position of the plug.

9. The structure according to claim 8 wherein the body is in two separate parts in coaxial relation to each other;
   means operable from the exterior of the body parts connect said parts for movement axially toward and away from each other to different adjusted positions;
   the said stop carried by the body structure is carried by one of the body parts and is movable axially therewith to different adjusted positions; and
   the spring is connected to one of the body parts for adjusting the force of the spring in predetermined relation to the relative axial position of the parts.

10. The structure according to claim 9 wherein the body inlet is in one of said body parts and the body outlet is in the other of said body parts;
    connecting means are provided on the parts, respectively, for connecting the body in a pipe line between the terminals thereof.

11. The structure according to claim 1 wherein said valve plug is resiliently expansible radially, at least at and adjacent the location of the O-ring, the degree of said resiliency is less than that of the O-ring.

12. The structure according to claim 1 wherein plug rotating means are provided on the plug and have surfaces disposed in the path of fluid flow through the body, and are shaped and arranged to be impelled by the fluid flow so as to rotate the plug about its axis.

13. The structure according to claim 1 wherein the O-ring groove and O-ring are spaced axially a substantial distance from each of the ends of said frusto-conical wall of the plug.

* * * * *